US010205148B2

(12) United States Patent
Kim et al.

(10) Patent No.: US 10,205,148 B2
(45) Date of Patent: Feb. 12, 2019

(54) RECHARGEABLE LITHIUM BATTERY

(71) Applicant: SAMSUNG SDI CO., LTD., Yongin-si, Gyeonggi-do (KR)

(72) Inventors: Cheon-Soo Kim, Yongin-si (KR); Kyeong-Min Jeong, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 378 days.

(21) Appl. No.: 14/252,577

(22) Filed: Apr. 14, 2014

(65) Prior Publication Data
US 2015/0125736 A1    May 7, 2015

(30) Foreign Application Priority Data

Nov. 7, 2013 (KR) ........................ 10-2013-0135033

(51) Int. Cl.
*H01M 10/42* (2006.01)
*H01M 10/052* (2010.01)
(Continued)

(52) U.S. Cl.
CPC ....... *H01M 2/1686* (2013.01); *H01M 2/1646* (2013.01); *H01M 2/1653* (2013.01);
(Continued)

(58) Field of Classification Search
CPC .................................................. H01M 2/1686
See application file for complete search history.

(56) References Cited

U.S. PATENT DOCUMENTS 5,922,492 A * 7/1999 Takita et al. .............. B32B 5/24
429/249
2002/0055036 A1* 5/2002 Shinohara et al. ... H01M 2/145
429/62
(Continued)

FOREIGN PATENT DOCUMENTS

EP    1 998 401 A2    12/2008
EP    2 393 143 A1    12/2011
(Continued)

OTHER PUBLICATIONS

EPO Search Report dated Mar. 16, 2015, for corresponding European Patent application 14192377.1, (8 pages).
(Continued)

*Primary Examiner* — Maria Laios
(74) *Attorney, Agent, or Firm* — Lewis Roca Rothgerber Christie LLP

(57) ABSTRACT

A rechargeable lithium battery includes an electrode assembly including a positive electrode including a positive current collector, a first separator on the positive electrode, a negative electrode including a negative current collector on the first separator, and a second separator on the negative electrode. The positive current collector and the negative current collector each have respective uncoated regions at two sides thereof. The first separator includes a first substrate including a polyolefin-based resin particle, and a coating layer on a side of the first substrate the coating layer being an inorganic layer or an organic layer. The second separator includes a second substrate including a polyolefin-based resin particle, and an outermost region and/or a central region of the electrode assembly includes one of the uncoated regions of the positive current collector, the first separator, one of the uncoated regions of the negative current collector and the second separator.

18 Claims, 5 Drawing Sheets

(51) Int. Cl.
*H01M 2/18* (2006.01)
*H01M 2/16* (2006.01)

(52) U.S. Cl.
CPC ............ *H01M 10/052* (2013.01); *H01M 2/18* (2013.01); *H01M 10/4235* (2013.01)

(56) References Cited

U.S. PATENT DOCUMENTS

| | | | |
|---|---|---|---|
| 2005/0058896 A1* | 3/2005 | Nomura | H01M 2/1673 429/142 |
| 2007/0178384 A1* | 8/2007 | Kajita et al. | H01M 2/1653 429/251 |
| 2011/0070471 A1* | 3/2011 | Cho | H01M 4/13 429/94 |
| 2013/0171499 A1 | 7/2013 | Yang et al. | |
| 2013/0236765 A1 | 9/2013 | Zhang et al. | |
| 2014/0023908 A1* | 1/2014 | Ueki et al. | H01M 2/16 429/144 |

FOREIGN PATENT DOCUMENTS

| | | | | |
|---|---|---|---|---|
| EP | 2 156 486 B1 | 1/2012 | | |
| JP | 2002-151044 A | 5/2002 | | |
| JP | 2008-053196 A | 3/2008 | | |
| JP | 2011-150866 A | 8/2011 | | |
| JP | 2011-181493 A | 9/2011 | | |
| JP | 2011-187241 A | 9/2011 | | |
| JP | 2013-187196 A | 9/2013 | | |
| KR | 10-2006-0042845 | 5/2006 | | |
| KR | 10-2006-0086022 | 7/2006 | | |
| KR | 10-2011-0058657 | 6/2011 | | |
| WO | WO2012131883 | * 10/2012 | ............. | H01M 2/16 |

OTHER PUBLICATIONS

EPO Office action dated Dec. 21, 2015, for corresponding European Patent application 14192377.1, (6 pages).
European Office Action dated Mar. 28, 2017 of the corresponding European Patent Application No. 14192377.1 (7 pages).
Japanese Office Action dated Oct. 23, 2018 in corresponding Chinese Patent Application No. 2014-222818 (5 pages).

* cited by examiner

RECHARGEABLE LITHIUM BATTERY

CROSS-REFERENCE TO RELATED APPLICATION

This application claims priority to and the benefit of Korean Patent Application No. 10-2013-0135033 filed in the Korean Intellectual Property Office on Nov. 7, 2013, the entire content of which is incorporated herein by reference.

BACKGROUND

1. Field

Aspects of embodiments of the present disclosure are directed toward a rechargeable lithium battery.

2. Description of the Related Art

A rechargeable lithium battery includes a positive electrode, a negative electrode and a separator between the positive electrode and the negative electrode.

The separator includes micropores through which lithium ions move, and the separator electrically insulates the positive electrode and the negative electrode from each other. The separator prevents (or reduces) overheating of a battery, by way of a shut-down function, when the battery temperature is above a predetermined (or set) temperature.

However, such a separator has a limit in that it does not sufficiently perform both the insulation of the positive electrode and the negative electrode from each other and the shut-down function to reduce overheating of the battery.

SUMMARY

One aspect of an embodiment is directed toward a rechargeable lithium battery having improved thermal safety during penetration of a battery.

According to one embodiment, a rechargeable lithium battery includes: an electrode assembly including a positive electrode including a positive current collector, a first separator on the positive electrode, a negative electrode including a negative current collector on the first separator, and a second separator on the negative electrode. The positive current collector and the negative current collector each have respective uncoated regions at two sides thereof. The first separator includes a first substrate including a polyolefin-based resin particle, and a coating layer on a side of the first substrate, the coating layer including an inorganic layer including an inorganic material, or an organic layer comprising an organic material. The second separator includes a second substrate including a polyolefin-based resin particle. An outermost region and/or a central region of the electrode assembly includes one of the uncoated regions of the positive current collector, the first separator, one of the uncoated regions of the negative current collector and the second separator.

The coating layer may be on one side of the first substrate, and the coating layer may face one of the uncoated regions of the negative current collector.

The coating layer may be on two sides of the first substrate and the two sides of the first substrate may face away from each other.

When the coating layer includes the inorganic layer as a first coating layer, the coating layer may be on at least one side of the first substrate, and the first separator may further include an organic layer including an organic material as a second coating layer. When the coating layer includes the organic layer as a first coating layer, the coating layer is on at least one side of the first substrate, and the first separator further comprises an inorganic layer comprising an inorganic material as a second coating layer.

The second separator may further include an organic layer including an organic material on at least one side of the second substrate.

The first substrate and the second substrate may each have pores having a pore size of about 0.01 μm to about 1 μm.

The first substrate and the second substrate may each have a thickness of about 6 μm to about 25 μm.

The polyolefin-based resin particle may have a particle size of about 0.1 μm to about 5 μm.

The inorganic material may include $SiO_2$, $Al_2O_3$, $Al(OH)_3$, $AlO(OH)$, $TiO_2$, $BaTiO_2$, $ZnO_2$, $Mg(OH)_2$, $MgO$, $Ti(OH)_4$, $ZrO_2$, aluminum nitride, silicon carbide, boron nitride, or a combination thereof.

The inorganic material may include a particle having a particle size of about 0.1 μm to about 5 μm.

The coating layer may have a thickness of about 0.5 μm to about 7 μm.

The coating layer may further include a binder, and the binder may include a styrene-butadiene rubber (SBR), carboxymethyl cellulose (CMC), polyvinylidene fluoride (PVdF), a polyvinylidene fluoride-hexafluoropropylene (PVdF-HFP) copolymer, ethylene vinylacetate (EVA), hydroxyethyl cellulose (HEC), polyvinyl alcohol (PVA), polyvinylbutyral (PVB), an ethylene-acrylic acid copolymer, acrylonitrile, a vinyl acetate derivative, polyethylene glycol, an acryl-based rubber, or a combination thereof.

The organic material may include a polymer particle including a polyolefin, a polyolefin derivative, a polyolefin wax, an acryl-based polymer, or a combination thereof; a binder including a styrene-butadiene rubber (SBR), carboxymethyl cellulose (CMC), polyvinylidene fluoride (PVdF), a polyvinylidene fluoride-hexafluoropropylene (PVdF-HFP) copolymer, ethylene vinylacetate (EVA), hydroxyethyl cellulose (HEC), polyvinyl alcohol (PVA), polyvinylbutyral (PVB), an ethylene-acrylic acid copolymer, acrylonitrile, a vinyl acetate derivative, polyethylene glycol, an acryl-based rubber, or a combination thereof; or a combination thereof.

The polymer particle may have a weight average molecular weight of about 300 to about 10,000.

The polymer particle may have a particle size of about 100 nm to about 5 μm.

The second coating layer may have a thickness of about 1 μm to about 6 μm.

Other embodiments are included in the following detailed description.

A rechargeable lithium battery having improved thermal safety during penetration of a battery may be realized.

BRIEF DESCRIPTION OF THE DRAWINGS

The accompanying drawings, together with the specification, illustrate embodiments of the present disclosure, and, together with the description, serve to explain principles of the present disclosure.

DETAILED DESCRIPTION

Figure 1:
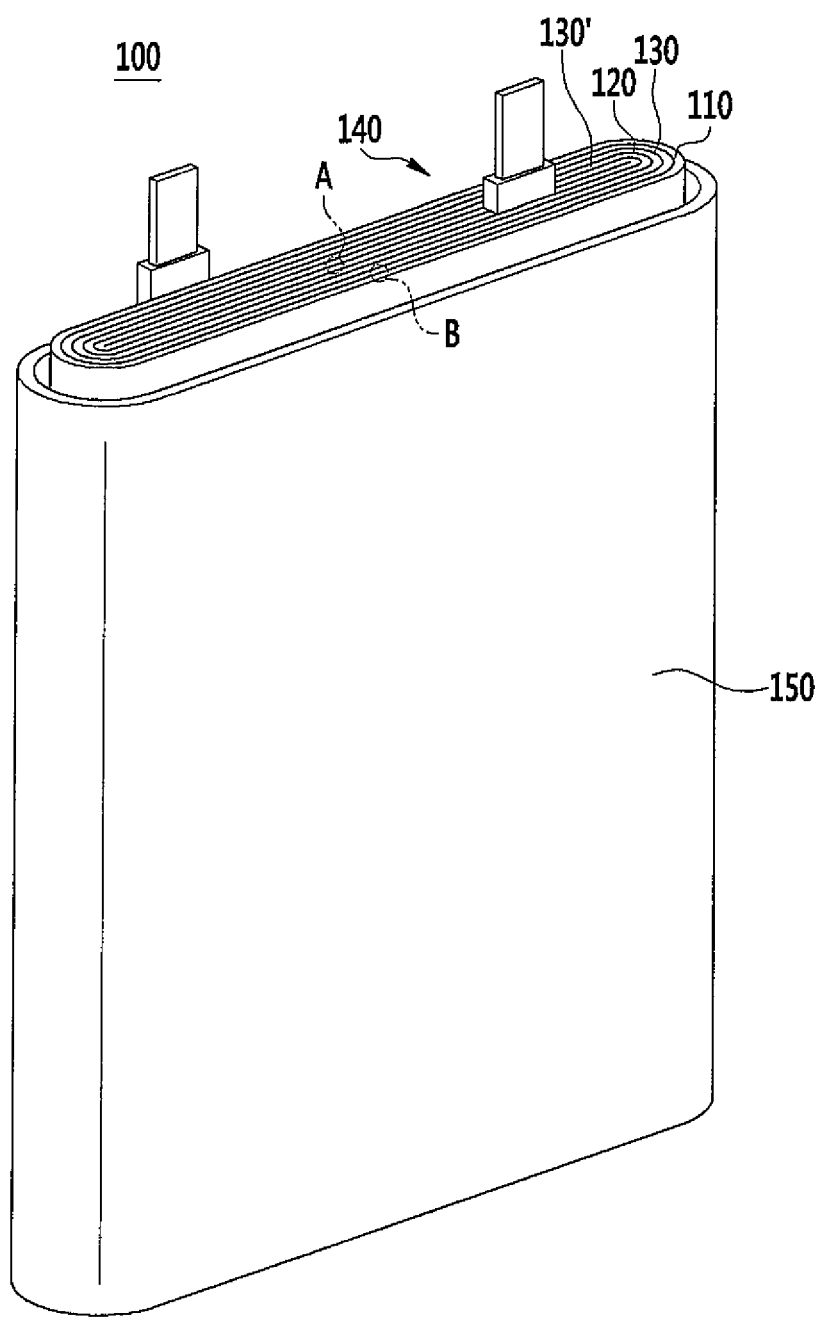
FIG. 1 is a perspective view showing a rechargeable lithium battery according to one embodiment.

Hereinafter, certain embodiments are shown and described, by way of illustration. However, these embodiments are examples, and this disclosure is not limited thereto. As those skilled in the art would recognize, the disclosed subject matter may be embodied in many different forms and should not be construed as being limited to the embodiments set forth herein. Also, in the context of the present disclosure, when a first element is referred to as being "on" a second element, it can be directly on the second element or be indirectly on the second element with one or more intervening elements therebetween. Like reference numerals designate like elements throughout the specification.

A rechargeable lithium battery according to one embodiment is described with reference to FIG. 1.

FIG. 1 is a perspective view of a rechargeable lithium battery according to one embodiment. The rechargeable lithium battery according to this embodiment is, for example, a prismatic battery, but the present disclosure is not limited thereto, and the present disclosure relates to various batteries, such as lithium polymer batteries, cylindrical batteries, and the like.

Referring to FIG. 1, a rechargeable lithium battery 100 according to one embodiment includes an electrode assembly 140 including a positive electrode 110, a first separator 130, a negative electrode 120 and a second separator 130' that are sequentially stacked, and a case 150 housing the electrode assembly 140. The positive electrode 110, the negative electrode 120, the first separator 130 and the second separator 130' may be impregnated with an electrolyte.

The positive electrode 110 includes a positive current collector. A positive active material layer is on (e.g., on at least one surface of) the positive current collector. The positive current collector may also include an uncoated 112 (shown in FIG. 2) region on which the positive active material layer is not positioned. For example, the uncoated region may be substantially free of a positive active material. As used herein, the term "substantially" is used as a term of approximation, and not as a term of degree. In particular, as used herein, "substantially free of a positive active material" refers to the absence of most the positive active material, but some trace amount of the positive active material may be present. In some embodiments, the uncoated region is completely free of the positive active material. The positive current collector may include uncoated regions at two sides thereof.

The negative electrode 120 includes a negative current collector. A negative active material layer is on (e.g., on at least one surface of) the negative current collector. The negative current collector may also include an uncoated region 122 (shown in FIG. 2) on which the negative active material layer is not positioned. For example, the uncoated region may be substantially free of a negative active material. As used herein, the term "substantially" is used as a term of approximation, and not as a term of degree. In particular, as used herein, "substantially free of a negative active material" refers to the absence of most the negative active material, but some trace amount of the negative active material may be present. In some embodiments, the uncoated region is completely free of the negative active material. The negative current collector may include uncoated regions at two sides thereof.

The first separator 130 may include a first substrate. The first separator 130 may further include a coating layer including at least one of an inorganic layer and/or an organic layer on at least one side of the first substrate.

The second separator 130' may include a second substrate. The second separator 130' may further include at least one of an inorganic layer and/or an organic layer on at least one side of the second substrate.

The first separator 130 and the second separator 130' may be the same (or substantially the same) or different from each other. For example, the first separator 130 and the second separator 130' may be different from each other, and, for example, the first separator 130 may have a lower thermal shrinkage ratio, while the second separator 130' may have a higher thermal shrinkage ratio. In some embodiments, the first separator 130 may have a lower thermal shrinkage ratio than the second separator 130'.

According to one embodiment, at least one part of an outmost (outermost) region and a central part (portion or region) of the electrode assembly 140 may be formed by positioning the first separator having the lower thermal shrinkage ratio between the uncoated region of the positive current collector and the uncoated region of the negative current collector and by simultaneously (or concurrently) positioning the second separator having the higher thermal shrinkage ratio between the uncoated region of the positive current collector and the uncoated region of the negative current collector as a layer separate from the first separator. In other words, at least one part of the outmost region and the central part of the electrode assembly 140 may have a structure in which the uncoated region of the positive current collector, the first separator, the uncoated region of the negative current collector, and the second separator are sequentially stacked. In a battery penetration test, a battery has an internal short circuit caused by external or foreign matter penetrating the battery, which generates heat, and increases an internal temperature of the battery. According to embodiments of the present disclosure, the second separator having the higher thermal shrinkage ratio is easily melted, thereby blocking or reducing an accumulation or concentration of heat at a region where the penetration occurred, promoting heat dissipation, and thus, improving penetration safety of the battery. Simultaneously (or concurrently), the first separator having the lower thermal shrinkage ratio may further improve safety of the battery as a result of an inorganic material included in an inorganic layer of the first separator.

According to embodiments of the present disclosure, the electrode assembly has the above structure between uncoated regions of the electrodes and, thus, may provide a rechargeable lithium battery having good thermal safety during penetration of the battery.

In FIG. 1, the A region corresponds to the central part of the electrode assembly 140, and the B region corresponds to the outmost region of the electrode assembly 140.

Figure 2:
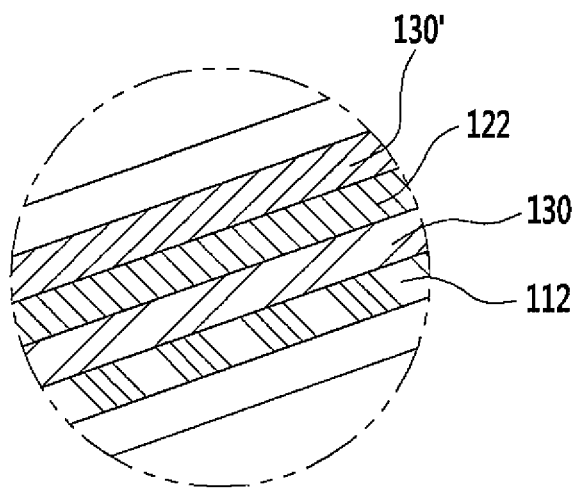
FIG. 2 is an enlarged perspective view of an A or B region in FIG. 1.

FIG. 2 is an enlarged perspective view of the A or B region in FIG. 1.

Referring to FIG. 2, at least one part of the outmost region (the B region) and the central part (the A region) of the electrode assembly 140 may have a structure in which the uncoated region 112 of the positive current collector, the first separator 130, the uncoated region 122 of the negative current collector, and the second separator 130' are sequentially stacked.

The first separator having the lower thermal shrinkage ratio may include, for example, a first substrate including a polyolefin-based resin particle and an inorganic layer including an inorganic material on at least one side of the first substrate. In other words, the inorganic layer may be positioned on both sides or on only one side of the first substrate. When the inorganic layer is positioned on only one side of the first substrate, the inorganic layer is positioned to face the uncoated region of the negative current collector.

The first separator may further include an organic layer including an organic material. For example, the organic layer may be positioned on the inorganic layer, or the organic layer may be directly on the first substrate.

The second separator having the higher thermal shrinkage ratio may include, for example, a second substrate including a polyolefin-based resin particle. In other words, in some embodiments, the second separator includes no inorganic layer (e.g., the second separator does not include an inorganic layer), in contrast to the first separator. The second separator may further include an organic layer including an organic material on at least one side of the second substrate.

The polyolefin-based resin particle is a material having a higher thermal shrinkage ratio and may include, for example, a polyethylene-based resin, a polypropylene-based resin, or a combination thereof, but the polyolefin-based resin particle is not limited thereto.

The polyolefin-based resin particle may have a particle size of about 0.1 μm to about 5 μm or, for example, about 0.5 μm to about 3 μm. When the polyolefin-based resin particle has a particle size within any of the foregoing ranges, movement resistance of lithium ions and a thickness of a coating layer such as the organic layer and the inorganic layer are minimized (or reduced), and thus, performance of a rechargeable lithium battery may be secured (e.g., provided or improved).

The first substrate and the second substrate may each include a pore (e.g., pores). Lithium ions may move through the pore.

The pore may have a pore size of about 0.01 μm to about 1 μm or, for example, about 0.1 μm to about 1 μm. When the pore has a pore size within any of the foregoing ranges, an internal short circuit due to formation of lithium dendrites may be prevented (or a likelihood of such a short circuit may be reduced), movement resistance of lithium ions may be minimized (or reduced), and performance and safety of a rechargeable lithium battery may be secured (e.g., provided or improved).

The first substrate and the second substrate may each have a thickness of about 6 μm to about 25 μm or, for example, about 7 μm to about 20 μm. When the first substrate and/or the second substrate has a thickness within any of the foregoing ranges, safety of a rechargeable lithium battery as a result of good physical characteristics may be secured (e.g., provided or improved) while capacity of the rechargeable lithium battery is secured (e.g., provided or improved).

The inorganic material may include $SiO_2$, $Al_2O_3$, $Al(OH)_3$, $AlO(OH)$, $TiO_2$, $BaTiO_2$, $ZnO_2$, $Mg(OH)_2$, $MgO$, $Ti(OH)_4$, $ZrO_2$, aluminum nitride, silicon carbide, boron nitride, or a combination thereof, but the inorganic material is not limited thereto.

The inorganic material may have a particle size of about 0.1 μm to about 5 μm or, for example, about 0.3 μm to about 1 μm. When the inorganic material particle has a particle size within any of the foregoing ranges, the particle of the inorganic material may be uniformly coated and minimize (or reduce) resistance of lithium ions and thus, secure (e.g., provide or improve) performance of a rechargeable lithium battery.

The inorganic layer may have a thickness of about 0.5 μm to about 7 μm or, for example, about 1 μm to about 6 μm. When the inorganic layer has a thickness within any of the foregoing ranges, safety of a rechargeable lithium battery may be further improved.

The inorganic layer may further include a binder besides (or in addition to) the inorganic material.

For example, the binder may include a styrene-butadiene rubber (SBR), carboxymethyl cellulose (CMC), polyvinylidene fluoride (PVdF), a polyvinylidene fluoride-hexafluoropropylene (PVdF-HFP) copolymer, ethylene vinylacetate (EVA), hydroxyethyl cellulose (HEC), polyvinyl alcohol (PVA), polyvinylbutyral (PVB), an ethylene-acrylic acid copolymer, acrylonitrile, a vinyl acetate derivative, polyethylene glycol, an acryl-based rubber, or a combination thereof, but the present disclosure is not limited thereto. For example, the binder may include the styrene-butadiene rubber (SBR), a mixture of the styrene-butadiene rubber (SBR) and the carboxymethyl cellulose (CMC), the ethylene vinylacetate (EVA), the polyvinyl alcohol (PVA), the ethylene-acrylic acid copolymer, or the acryl-based rubber.

The organic material may include a polymer particle including a polyolefin, a polyolefin derivative, a polyolefin wax, an acryl-based polymer, or a combination thereof; a binder including a styrene-butadiene rubber (SBR), carboxymethyl cellulose (CMC), polyvinylidene fluoride (PVdF), a polyvinylidene fluoride-hexafluoropropylene (PVdF-HFP) copolymer, ethylene vinylacetate (EVA), hydroxyethyl cellulose (HEC), polyvinyl alcohol (PVA), polyvinylbutyral (PVB), an ethylene-acrylic acid copolymer, acrylonitrile, a vinyl acetate derivative, polyethylene glycol, an acryl-based rubber, or a combination thereof; or a combination thereof, but the present disclosure is not limited thereto.

When the organic material includes the polymer particle, the polymer particle may have a weight average molecular weight of about 300 to about 10,000 or, for example, about 2,000 to about 6,000. The polymer particle may have a particle size of about 100 nm to about 5 μm or, for example, about 200 nm to about 3 μm. When the organic material has a weight average molecular weight within any of the foregoing ranges, and the particle has a particle size within any of the foregoing ranges, movement resistance of lithium ions may be minimized (or reduced), and thus, performance of a rechargeable lithium battery may be secured (e.g., provided or improved).

The organic layer may have a thickness of about 1 μm to about 6 μm or, for example, about 3 μm to about 6 μm. When the organic layer has a thickness within any of the foregoing ranges, a thin rechargeable lithium battery may be manufactured, and expansion of the battery as charge and discharge cycles are repeated may be further prevented (or reduced).

The positive current collector may be aluminum, but the positive current collector is not limited thereto.

The positive active material layer includes the positive active material.

The positive active material may be a compound (e.g., lithiated intercalation compound) capable of intercalating and deintercalating lithium. For example, the positive active material may include a lithium metal oxide, but the positive active material is not limited thereto.

The lithium metal oxide may, for example, be an oxide of at, least one of cobalt, manganese, nickel, or aluminum, and lithium, but the lithium metal oxide is not limited thereto. For example, the lithium metal oxide may be one of the compounds represented by one of the following chemical formulae.

$Li_aA_{1-b}X_bD_2$ (0.90≤a≤1.8, 0≤b≤0.5); $Li_aA_{1-b}X_bO_{2-c}D_c$ (0.90≤a≤1.8, 0≤b≤0.5, 0≤c≤0.05); $Li_aE_{1-b}X_bO_{2-c}D_c$ (0.90≤a≤1.8, 0≤b≤0.5, 0≤c≤0.05); $Li_aE_{2-b}X_bO_{4-c}D_c$ (0.90≤a≤1.8, 0≤b≤0.5, 0≤c≤0.05); $Li_aNi_{1-b-c}Co_bX_cD_\alpha$ (0.90≤a≤1.8, 0≤b≤0.5, 0≤c≤0.05, 0<α≤2); $Li_aNi_{1-b-c}Co_bX_cO_{2-\alpha}T_\alpha$ (0.90≤a≤1.8, 0≤b≤0.5, 0≤c≤0.05, 0<α<2); $Li_aNi_{1-b-c}Co_bX_cO_{2-\alpha}T_2$ (0.90≤a≤1.8, 0≤b≤0.5, 0≤c≤0.05, 0<α<2); $Li_aNi_{1-b-c}Mn_bX_cD_\alpha$ (0.90≤a≤1.8, 0≤b≤0.5, 0≤c≤0.05, 0<α≤2); $Li_aNi_{1-b-c}Mn_bX_cO_{2-\alpha}T_\alpha$ (0.90≤a≤1.8, 0≤b≤0.5, 0≤c≤0.05, 0<α<2); $Li_aNi_{1-b-c}Mn_bX_cO_{2-\alpha}T_2$ (0.90≤a≤1.8, 0≤b≤0.5, 0≤c≤0.05, 0<α<2); $Li_aNi_bE_cG_dO_2$ (0.90≤a≤1.8, 0≤b≤0.9, 0≤c≤0.5, 0.001≤d≤0.1); $Li_aNi_bCo_cMn_dG_eO_2$ (0.90≤a≤1.8, 0≤b≤0.9, 0≤c≤0.5, 0≤d≤0.5, 0.001≤e≤0.1); $Li_aNIG_bO_2$ (0.90≤a≤1.8, 0.001≤b≤0.1); $Li_aCoG_bO_2$ (0.90≤a≤1.8, 0.001≤b≤0.1); $Li_aMn_{1-b}G_bO_2$ (0.90≤a≤1.8, 0.001≤b≤0.1); $Li_aMn_2G_bO_4$ (0.90≤a≤1.8, 0.001≤b≤0.1); $Li_aMn_{1-g}G_gPO_4$ (0.90≤a≤1.8, 0≤g≤0.5); $LiQS_2$; $LiV_2O_5$; $LiZO_2$; $LiNiVO_4$; $Li_{(3-f)}J_2(PO_4)_3$ (0≤f≤2); $Li_{(3-f)}Fe_2(PO_4)_3$ (0≤f≤2); and $LiFePO_4$.

In the above chemical formulae, A is Ni, Co, Mn, or a combination thereof; X is Al, Ni, Co, Mn, Cr, Fe, Mg, Sr, V, a rare earth element, or a combination thereof; D is O, F, S, P, or a combination thereof; E is Co, Mn, or a combination thereof; T is F, S, P, or a combination thereof; G is Al, Cr, Mn, Fe, Mg, La, Ce, Sr, V, or a combination thereof; Q is —Ti, Mo, Mn, or a combination thereof; Z is Cr, V, Fe, Sc, Y, or a combination thereof; and J is V, Cr, Mn, Co, Ni, Cu, or a combination thereof.

The lithium metal oxide may be, for example, lithium nickel cobalt manganese oxide, lithium nickel cobalt aluminum oxide, or a combination thereof, and among them, for example, a mixture of the lithium nickel cobalt manganese oxide and the lithium nickel cobalt aluminum oxide may be used.

The positive active material layer may further include a binder and a conductive material besides (or in addition to) the positive active material.

The binder improves binding properties of particles of the positive active material with each other, and the positive active material with the positive current collector. Examples of the binder may include polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but the binder is not limited thereto.

The conductive material improves conductivity of an electrode. Any suitably electrically conductive material may be used as a conductive material, unless it causes a chemical change in the battery. Examples of the conductive material may include a carbon-based material such as natural graphite, artificial graphite, carbon black, acetylene black, ketjen black, a carbon fiber, and the like; a metal-based material such as a metal powder or a metal fiber and the like of copper, nickel, aluminum, silver, and the like; a conductive polymer such as a polyphenylene derivative and the like; or a mixture thereof, but the conductive material is not limited thereto.

The negative current collector may use (or include) a copper foil.

The negative active material layer may include a negative active material, a binder, and, optionally, a conductive material.

The negative active material may include a material that reversibly intercalates/deintercalates lithium ions, a lithium metal, a lithium metal alloy, a material capable of doping and dedoping lithium, or transition metal oxide, but the negative active material is not limited thereto.

The material that reversibly intercalates/deintercalates lithium ions may be a carbon material, which may be any suitable carbon-based negative active material generally used in rechargeable lithium batteries. Examples of the carbon material may include crystalline carbon, amorphous carbon, or a mixture thereof, but the carbon material is not limited thereto. Examples of the crystalline carbon may include graphite such as amorphous, sheet-shape, flake, spherical shape or fiber-shaped natural graphite or artificial graphite, and examples of the amorphous carbon may include soft carbon or hard carbon, a mesophase pitch carbonized product, fired coke, and the like.

The lithium metal alloy may be an alloy of lithium and a metal selected from Na, K, Rb, Cs, Fr, Be, Mg, Ca, Sr, Si, Sb, Pb, In, Zn, Ba, Ra, Ge, Al, and Sn, but the lithium metal alloy is not limited thereto.

The material being capable of doping and dedoping lithium may be Si, $SiO_x$ (0<x<2), a Si—C composite, a Si-Q alloy (where Q is an alkali metal, an alkaline-earth metal, Group 13 to 16 elements, a transition metal, a rare earth element or a combination thereof, and not Si), Sn, $SnO_2$, a Sn—C composite, Sn—R (where R is an alkali metal, an alkaline-earth metal, Group 13 to 16 elements, a transition metal, a rare earth element, or a combination thereof, and not Sn), and the like, and at least one of the foregoing may be mixed with $SiO_2$. Examples of Q and R may include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof.

The transition metal oxide may be vanadium oxide, lithium vanadium oxide, and the like, but the transition metal oxide is not limited thereto.

The binder improves binding properties of particles of the negative active material with each other, and the negative active material with the negative current collector. The binder may include a non-water-soluble binder, a water-soluble binder, or a combination thereof.

Nonlimiting examples of the non-water-soluble binder include polyvinylchloride, carboxylated polyvinylchloride, polyvinyl fluoride, ethylene oxide-containing polymers, polyvinylpyrrolidone, polyurethane, polytetrafluoroethylene, polyvinylidene fluoride, polyethylene, polypropylene, polyamideimide, polyimide, and combinations thereof.

Nonlimiting examples of the water-soluble binder include styrene-butadiene rubbers, acrylated styrene-butadiene rubbers, polyvinyl alcohol, sodium polyacrylate, copolymers of propylene and a C2 to C8 olefin, copolymers of (meth)acrylic acid and (meth)acrylic acid alkyl ester, and combinations thereof.

When a water-soluble binder is used as the negative electrode binder, a cellulose-based compound may also be included to provide viscosity. The cellulose-based compound may include one or more of carboxymethyl cellulose, hydroxypropylmethyl cellulose, methyl cellulose, and alkali metal salts thereof. The alkali metal may be Na, K, or Li. The cellulose-based compound may be included in an amount of about 0.1 to about 3 parts by weight based on 100 parts by weight of the negative active material.

The conductive material improves conductivity of an electrode. Any suitably electrically conductive material may be used as a conductive material, unless it causes a chemical change in the battery. Examples of the conductive material may include a carbon-based material such as natural graphite, artificial graphite, carbon black, acetylene black, ketjen black, a carbon fiber, and the like; a metal-based material such as a metal powder or a metal fiber and the like of copper, nickel, aluminum, silver, and the like; a conductive polymer such as a polyphenylene derivative and the like; or a mixture thereof, but the conductive material is not limited thereto.

The electrolyte includes a non-aqueous organic solvent and a lithium salt.

The non-aqueous organic solvent serves as a medium for transmitting ions taking part in the electrochemical reaction of the battery. The non-aqueous organic solvent may be a carbonate-based, ester-based, ether-based, ketone-based, alcohol-based, or aprotic solvent, but the non-aqueous organic solvent is not limited thereto.

Examples of the carbonate-based solvent may include, for example, dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), and the like, but the carbonate-based solvent is not limited thereto.

For example, the non-aqueous organic solvent may include linear carbonate compounds or cyclic carbonate compounds. When the linear carbonate compounds and cyclic carbonate compounds are mixed, an organic solvent having a high dielectric constant and low viscosity may be provided. In some embodiments, the cyclic carbonate compound and the linear carbonate compound are mixed together in a volume ratio ranging from about 1:1 to about 1:9.

Examples of the ester-based solvent include, for example, methylacetate, ethylacetate, n-propylacetate, dimethylacetate, methylpropionate, ethylpropionate, γ-butyrolactone, decanolide, valerolactone, mevalonolactone, caprolactone, and the like, but the ester-based solvent is not limited thereto. Examples of the ether-based solvent may include, for example dibutylether, tetraglyme, diglyme, dimethoxyethane, 2-methyltetrahydrofuran, tetrahydrofuran, and the like, and examples of the ketone-based solvent may include cyclohexanone, and the like, but the ether-based solvent and the ketone-based solvent are not limited thereto. In addition, examples of the alcohol-based solvent may include ethanol, isopropyl alcohol, and the like, but the alcohol-based solvent is not limited thereto.

The non-aqueous organic solvent may be used singularly or in a mixture. When the organic solvent is used in a mixture, the mixture ratio may be controlled in accordance with a desirable battery performance.

The electrolyte may further include an overcharge inhibitor additive such as ethylenecarbonate, pyrocarbonate, or the like.

The lithium salt is dissolved in an organic solvent, supplies lithium ions in the battery, generally facilitates operation of the rechargeable lithium battery, and improves lithium ion transportation between the positive and negative electrodes therein.

Examples of the lithium salt may include $LiPF_6$, $LiBF_4$, $LiSbF_6$, $LiAsF_6$, $LiN(SO_3C_2F_6)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, where, x and y are natural numbers, LiCl, LiI, $LiB(C_2O_4)_2$ (lithium bis(oxalato)borate, LiBOB), or a combination thereof, but the lithium salt is not limited thereto.

The lithium salt may be used (or present) in a concentration of about 0.1 M to about 2.0 M. When the lithium salt is included within the above concentration range, an electrolyte may have good performance and lithium ion mobility due to suitable (or optimal) electrolyte conductivity and viscosity.

Hereinafter, embodiments of the present disclosure are illustrated with reference to examples. However, these are examples, and the present disclosure is not limited thereto.

Example 1

(Manufacture of Positive Electrode)

97.4 wt % of $LiCoO_2$, 1.3 wt % of carbon black, and 1.3 wt % of polyvinylidene fluoride were added to an N-methylpyrrolidone (NMP) solvent to prepare a slurry. The slurry was coated on an aluminum (Al) foil over a predetermined (or set) distance and area, dried, and roll-pressed, manufacturing a positive electrode. The positive electrode had a positive active material layer region and an uncoated region having no positive active material layer on the aluminum foil.

(Manufacture of Negative Electrode)

97.5 wt % of graphite, 1.5 wt % of a styrene-butadiene rubber (SBR), and 1 wt % of carboxymethyl cellulose (CMC) were added to water as a solvent to prepare a slurry. The slurry was coated on a copper foil over a predetermined (or set) distance and area, dried, and roll-pressed, manufacturing a negative electrode. The negative electrode had a negative active material layer region and an uncoated region having no negative active material layer on the copper foil.

(Manufacture of Separator)

First Separator 95 wt % of AlO(OH), having a particle size of 0.6 μm, and 5 wt % of a styrene-butadiene rubber (SBR) were mixed in water to prepare an inorganic layer composition. In addition, an organic layer composition was prepared by mixing 97.5 wt % of an acryl-based polymer (FA016A, available from Asahi Inc., weight average molecular weight: about 8000, particle size: about 300 nm) and 2.5 wt % of a styrene-butadiene rubber (SBR) in water.

The inorganic layer composition was coated on one side of a polyethylene substrate having a pore size of 0.1 to 1 μm to form an inorganic layer, and the organic layer composition was coated on two sides of the resultant substrate (the substrate having the inorganic layer on one side thereof) to form organic layers, thereby manufacturing a separator. Herein, the organic layer was formed to have a dot-shaped pattern. In addition, the substrate was 12 μm thick. The thickness of the inorganic layer on one side of the substrate was 4 μm, and the total thickness of the organic layers on the two sides of the substrate was 2 μm (i.e., each organic layer had a thickness of 1 μm). The resulting separator had a thermal shrinkage ratio of 1% at 120° C. for 1 hour.

Second Separator

A polyethylene separator was used. The separator had a thermal shrinkage ratio of 5% at 120° C. for 1 hour.

(Preparation of Electrolyte)

An electrolyte was prepared by mixing ethylene carbonate, propylene carbonate, ethylmethyl carbonate, and diethyl carbonate in a volume ratio of 25:5:40:30 to prepare a mixed solvent and adding 1.15 M of $LiPF_6$ thereto.

(Manufacture of Rechargeable Lithium Battery Cell)

A rechargeable lithium battery cell was manufactured by sequentially stacking and spirally winding the positive electrode, the first separator, the negative electrode, and the second separator to manufacture an electrode assembly and then, injecting the electrolyte therein. Herein, at least one part of the outmost region and the central part of the electrode assembly had a structure formed by sequentially stacking and spirally winding the uncoated region of the positive current collector, the first separator, the uncoated region of the negative current collector, and the second separator.

Example 2

A rechargeable lithium battery cell was manufactured as in Example 1 except that a separator manufactured as in the following description was used as the second separator instead of the polyethylene separator.

The separator was manufactured by coating the organic layer composition on two sides of a polyethylene substrate having a pore with a pore size of 0.1 to 1 μm. Herein, the polyethylene substrate was 16 μm thick, and when the organic layer was on two (both) sides of the substrate (the two sides of the substrate facing away from each other), the organic layer was 2 μm thick in total (i.e., the organic layer on each side had a thickness of 1 μm).

Comparative Example 1

A rechargeable lithium battery cell was manufactured as in Example 1 except that the separator used as the first separator in Example 1 was used as the second separator instead of the polyethylene separator.

Evaluation 1: Nail Penetration Test

When a nail with a diameter of 2.5ϕ (2.5 mm) penetrated the battery cells according to Examples 1 and 2 and Comparative Example 1 at a speed of 100 mm/sec, a relationship between respective voltage and temperature of the rechargeable lithium battery cells was measured. The results of the penetration tests are shown in FIGS. 3 and 4.

Figure 3:
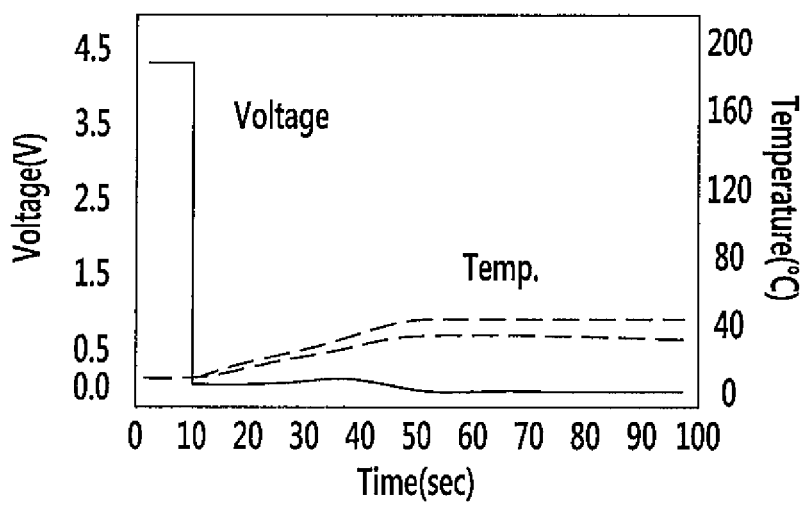
FIG. 3 is a graph showing voltage behavior and temperature changes of a rechargeable lithium battery according to one embodiment during a nail penetration test.

When the penetration test was performed on 10 battery cells for each of Example 1, Example 2 and Comparative Example 1, ten battery cells according to Examples 1 and 2 all showed results consistent with Case 1 as shown in FIG. 3. In addition, battery cells according to Comparative Example 1 showed results consistent with Case 2 as shown in FIG. 4.

Figure 4:
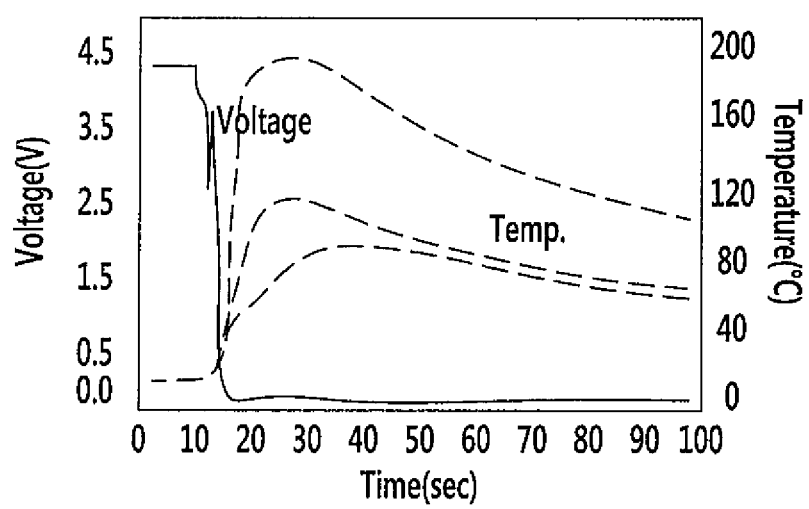
FIG. 4 is a graph showing voltage behavior and temperature changes of a rechargeable lithium battery according to Comparative Example 1 during a nail penetration test.

FIG. 3 is a graph showing a mode (Case 1) of a voltage behavior and temperature changes in a nail penetration test of a rechargeable lithium battery cell, and FIG. 4 is a graph showing another mode (Case 2) of a voltage behavior and temperature changes in a nail penetration test of a rechargeable lithium battery.

FIG. 3 corresponding to Case 1 shows that a burr of a negative current collector and a hard short circuit of a positive current collector occurred in a penetration part, a polyethylene separator in the penetration part melted and additionally generated a short circuit and decreased energy in a hard short circuit region, and thus, the burr did not melt and the short circuit region was maintained. In this case (Case 1), the voltage was completely drained, a current flew through the short circuit region for a predetermined (or set) time, and thus, a temperature on the surface of the cell increased up to 100° C. or so and slowly decreased back down to room temperature.

FIG. 4 corresponding to Case 2 showed that the burr of a positive current collector was not melted as a result of interference of a ceramic-coated separator after the voltage was recovered in Case 1, but instead exploded when a secondary short circuit occurred.

Referring to FIGS. 3 and 4, since the rechargeable battery cell of Comparative Example 1 formed by positioning a separator with a small thermal shrinkage ratio between uncoated regions of an electrode showed the result of Case 2, the rechargeable battery cells of Examples 1 and 2 formed by respectively positioning a separator with a larger thermal shrinkage ratio and another separator with a smaller thermal shrinkage ratio between uncoated regions of an electrode showed good thermal safety during penetration compared with the battery of Comparative Example 1.

Figure 5:
FIG. 5 is a table including optical microscope photographs showing components of rechargeable lithium battery cells according to Examples 1 and 2 and Comparative Example 1 after penetration testing.

In addition, the cells were separated (taken apart) after the penetration test and the Al foil, the first separator, the Cu foil, and the second separator were examined with an optical microscope, and the results are shown in FIG. 5.

FIG. 5 is a table including optical microscope photographs of components of the decomposed cells after the penetration tests of the rechargeable battery cells according to Examples 1 and 2 and Comparative Example 1.

Referring to FIG. 5, the rechargeable battery cells according to Examples 1 and 2 formed by respectively positioning each separator having larger and smaller thermal shrinkage ratios between uncoated regions of an electrode showed a smaller loss part of the Al foil and more melting of the second separator than the rechargeable battery cell formed by positioning only separators having a small thermal shrinkage ratio between uncoated regions of an electrode. Accordingly, the rechargeable lithium battery cell according to an embodiment of the present disclosure showed good penetration safety.

While this disclosure has been described in connection with what is presently considered to be practical embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A rechargeable lithium battery comprising:
an electrode assembly comprising a positive electrode comprising a positive current collector, a first separator on the positive electrode, a negative electrode comprising a negative current collector on the first separator, and a second separator on the negative electrode,
wherein the positive current collector and the negative current collector each have respective uncoated regions at two sides thereof,
the first separator comprises a first substrate comprising a polyolefin-based resin particle, an inorganic layer comprising an inorganic material on one side of the first substrate, and an organic layer comprising an organic material on the inorganic layer, wherein the inorganic layer is positioned to face the uncoated region of the negative current collector and the uncoated region of the negative current collector, the first substrate, the inorganic layer, and the organic layer are sequentially stacked in the stated order,
the second separator comprises a second substrate comprising a polyolefin-based resin particle,
the thermal shrinkage ratio of the first separator is lower than that of the second separator,
an outermost region and/or a central region of the electrode assembly comprises one of the uncoated regions of the positive current collector, the first separator, one of the uncoated regions of the negative current collector and the second separator, and the first separator directly contacts the uncoated region of the positive current collector.

2. The rechargeable lithium battery of claim 1, wherein the inorganic layer is on two sides of the first substrate and the two sides of the first substrate face away from each other.

3. The rechargeable lithium battery of claim 1, wherein the second separator further comprises an organic layer comprising an organic material on at least one side of the second substrate.

4. The rechargeable lithium battery of claim 3, wherein the organic material comprises a polymer particle comprising a polyolefin, a polyolefin derivative, a polyolefin wax, an acryl-based polymer, or a combination thereof; a binder comprising a styrene-butadiene rubber (SBR), carboxymethyl cellulose (CMC), polyvinylidene fluoride (PVdF), a polyvinylidene fluoride-hexafluoropropylene (PVdF-HFP) copolymer, ethylene vinylacetate (EVA), hydroxyethyl cellulose (HEC), polyvinyl alcohol (PVA), polyvinylbutyral (PVB), an ethylene-acrylic acid copolymer, acrylonitrile, a vinyl acetate derivative, polyethylene glycol, an acryl-based rubber, or a combination thereof; or a combination thereof.

5. The rechargeable lithium battery of claim 4, wherein the polymer particle has a weight average molecular weight of about 300 to about 10,000.

6. The rechargeable lithium battery of claim 4, wherein the polymer particle has a particle size of about 100 nm to about 5 µm.

7. The rechargeable lithium battery of claim 1, wherein the first substrate and the second substrate each have pores having a pore size of about 0.01 µm to about 1 µm.

8. The rechargeable lithium battery of claim 1, wherein the first substrate and the second substrate each have a thickness of about 6 µm to about 25 µm.

9. The rechargeable lithium battery of claim 1, wherein the polyolefin-based resin particle has a particle size of about 0.1 µm to about 5 µm.

10. The rechargeable lithium battery of claim 1, wherein the inorganic material comprises $SiO_2$, $Al_2O_3$, $Al(OH)_3$, $AlO(OH)$, $TiO_2$, $BaTiO_2$, $ZnO_2$, $Mg(OH)_2$, $MgO$, $Ti(OH)_4$, $ZrO_2$, aluminum nitride, silicon carbide, boron nitride, or a combination thereof.

11. The rechargeable lithium battery of claim 1, wherein the inorganic material comprises a particle having a particle size of about 0.1 µm to about 5 µm.

12. The rechargeable lithium battery of claim 1, wherein a coating layer comprising the inorganic layer and the organic layer has a thickness of about 0.5 µm to about 7 µm.

13. The rechargeable lithium battery of claim 1, wherein a coating layer comprising the inorganic layer and the organic layer further comprises a binder.

14. The rechargeable lithium battery of claim 13, wherein the binder comprises a styrene-butadiene rubber (SBR), carboxymethyl cellulose (CMC), polyvinylidene fluoride (PVdF), a polyvinylidene fluoride-hexafluoropropylene (PVdF-HFP) copolymer, ethylene vinylacetate (EVA), hydroxyethyl cellulose (HEC), polyvinyl alcohol (PVA), polyvinylbutyral (PVB), an ethylene-acrylic acid copolymer, acrylonitrile, a vinyl acetate derivative, polyethylene glycol, an acryl-based rubber, or a combination thereof.

15. The rechargeable lithium battery of claim 1, wherein the organic material comprises a polymer particle comprising a polyolefin, a polyolefin derivative, a polyolefin wax, an acryl-based polymer, or a combination thereof; a binder comprising a styrene-butadiene rubber (SBR), carboxymethyl cellulose (CMC), polyvinylidene fluoride (PVdF), a polyvinylidene fluoride-hexafluoropropylene (PVdF-HFP) copolymer, ethylene vinylacetate (EVA), hydroxyethyl cellulose (HEC), polyvinyl alcohol (PVA), polyvinylbutyral (PVB), an ethylene-acrylic acid copolymer, acrylonitrile, a vinyl acetate derivative, polyethylene glycol, an acryl-based rubber, or a combination thereof; or a combination thereof.

16. The rechargeable lithium battery of claim 15, wherein the polymer particle has a weight average molecular weight of about 300 to about 10,000.

17. The rechargeable lithium battery of claim 15, wherein the polymer particle has a particle size of about 100 nm to about 5 µm.

18. The rechargeable lithium battery of claim 1, wherein the organic layer has a thickness of about 1 to about 6 µm.

* * * * *